(12) United States Patent
Antonell et al.

(10) Patent No.: US 6,899,596 B2
(45) Date of Patent: May 31, 2005

(54) CHEMICAL MECHANICAL POLISHING OF DUAL ORIENTATION POLYCRYSTALLINE MATERIALS

(75) Inventors: Michael Antonell, Summerfield, NC (US); Jennifer A. Antonell, Summerfield, NC (US); Erik Cho Houge, Orlando, FL (US); Ryan Keith Maynard, St. Cloud, FL (US); Darrell L. Simpson, Gotha, FL (US)

(73) Assignee: Agere Systems, Inc., Allentown, PA (US)

( * ) Notice: Subject to any disclaimer, the term of this patent is extended or adjusted under 35 U.S.C. 154(b) by 106 days.

(21) Appl. No.: 10/121,370

(22) Filed: Apr. 12, 2002

(65) Prior Publication Data

US 2003/0162481 A1 Aug. 28, 2003

Related U.S. Application Data

(60) Provisional application No. 60/359,222, filed on Feb. 22, 2002.

(51) Int. Cl.[7] .................................................. B24B 1/00
(52) U.S. Cl. ......................................... 451/41; 451/60
(58) Field of Search ................... 451/41, 60; 252/79.1, 252/79.2, 79.4, 79.5; 51/309

(56) References Cited

U.S. PATENT DOCUMENTS

| | | | |
|---|---|---|---|
| 5,391,258 A | | 2/1995 | Brancaleoni et al. |
| 5,770,103 A | | 6/1998 | Wang et al. |
| 5,807,165 A | | 9/1998 | Uzoh et al. |
| 5,873,769 A | * | 2/1999 | Chiou et al. ................... 451/41 |
| 6,312,321 B1 | | 11/2001 | Fukushima et al. |
| 6,520,840 B1 | * | 2/2003 | Wang et al. ................... 451/41 |
| 6,569,349 B1 | * | 5/2003 | Wang et al. ................ 252/79.1 |
| 6,623,355 B2 | * | 9/2003 | McClain et al. .............. 451/60 |

FOREIGN PATENT DOCUMENTS

| | | |
|---|---|---|
| EP | 00309511.4 | 5/2001 |
| WO | PCT/US01/48100 | 5/2002 |

* cited by examiner

*Primary Examiner*—Dung Van Nguyen

(57) ABSTRACT

A chemical mechanical polishing (CMP) process using a chemically active slurry having a polarity selected to affect the relative oxidation rates of respective crystalline planes of a polycrystalline surface being polished. The slurry polarity is controlled to equilibrate the material removal rates from the respective crystalline planes during the CMP process. A polar solute may be added to a base solvent to achieve the desired polarity. A CMP process for a tungsten film may utilize a water-based slurry containing an abrasive agent, an oxidizing agent, and a solute having a polarity less than that of water. The abrasive agent may be colloidal silica, the oxidizing agent may be hydrogen peroxide, and the solute may be benzene.

26 Claims, 2 Drawing Sheets

CHEMICAL MECHANICAL POLISHING OF DUAL ORIENTATION POLYCRYSTALLINE MATERIALS

This application claims the benefit of the Feb. 22, 2002, filing date of U.S. provisional patent application No. 60/359,222.

FIELD OF THE INVENTION

The present invention relates to microelectronic devices and, more particularly, to the chemical mechanical polishing (CMP) of polycrystalline materials.

BACKGROUND OF THE INVENTION

Microelectronic devices, such as ultra large-scale integrated (ULSI) circuits, are commonly formed as multi-layered devices having alternating layers of conductors and dielectric material. Each of these layers is deposited separately and often the layers are polished to a high degree of planarity prior to the deposition of an overlying layer. Chemical mechanical polishing is the leading process used to produce planar multi-layer metallization systems in modem ULSI circuits.

Prior to depositing a metal interconnect or conductor layer, a relatively thick dielectric layer is deposited over a substrate and any integrated circuit devices formed on the substrate. The dielectric layer is then polished using a chemically active slurry and a polishing pad to produce a very flat or planar surface. Contact holes or vias are etched in the dielectric material. A barrier metal and a tungsten film are then deposited over the etched dielectric in order to fill the vias. The tungsten film is then polished off the surface leaving a flat surface with the contact holes or vias filled with plugs of the barrier metal and tungsten. The metal interconnect layer is then deposited over the polished dielectric layer, forming electrical connection with the tungsten plugs.

A known difficulty with CMP operations is that the rate of material removal may be uneven across the surface of the wafer. U.S. Pat. No. 5,873,769 issued to Chiou, et al., describes a method and apparatus for achieving a uniform removal rate across the surface of a wafer. The Chiou patent addresses only variations in removal rates resulting from varying mechanical conditions across the wafer, and it does not address variations in removal rates resulting from changes in material characteristics of the wafer material.

The duration of a CMP process must be carefully controlled to ensure that a sufficient amount of material is removed without removing an excess amount of material. Various endpoint detection techniques are used to determine the proper time to terminate a CMP process. One endpoint detection technique involves following a power curve as the resistance on the platen increases as the polishing process progresses. This process relies on the simplifying assumption that the material removal rate is constant across the depth of the material being removed. In actuality, the instantaneous removal rate of a particular material may vary across its depth, and the resistance curve may become either dilated or eroded with respect to time. This may cause the proper endpoint to be missed.

SUMMARY OF THE INVENTION

Thus, an improved chemical mechanical polishing process is needed to account for variations in material removal rates resulting from varying material conditions. Further, an improved chemical mechanical polishing process is needed to provide more accurate control of the endpoint of the polishing process.

A slurry for controlling material removal rates from a plurality of different crystalline planes along a surface of a polycrystalline material is described herein as including: a primary carrier constituent; an oxidizing constituent; and a polarity-influencing constituent. The polarity-influencing constituent may be greater than 10% by volume of the slurry. In one embodiment, the primary carrier constituent may be water and the polarity-influencing constituent may be a material having a polarity less than that of water, for example having a dipole moment less than 1.8. The polarity-influencing constituent may be benzene.

A slurry polishing process for controlling material removal rates from a plurality of crystalline planes along a surface of a polycrystalline material is described herein as including the step of controlling the polarity of the slurry to modify relative material removal rates from the different crystalline planes to be different than relative material removal rates from the respective crystalline planes that would be achieved using a slurry having polarity dominated by a water constituent. The polarity of the slurry may be controlled in response to the relative area fractions of the respective crystalline planes along the surface.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The fabrication of microelectronics devices involves the deposition and removal of multiple layers of material on a semiconductor substrate to form active semiconductor devices and circuits. Such devices utilize multiple layers of metal and dielectric materials that can selectively connect or isolate device elements within a layer and between layers. Integrated circuits using up to six levels of interconnects have been reported and even more complex circuits are expected in the future. Device geometries have gone from 0.50 micron to 0.12 micron and will soon be 0.08 micron. Multi-levels of metallization are required in such devices. With these reductions in device geometry, each inter-metal level must be planarized before forming a subsequent level. The generally accepted process for creating sufficiently planar surfaces is chemical mechanical polishing (CMP). CMP may be used to remove high topographic variations and to remove defects, scratches or embedded particles from the surface of a semiconductor wafer. CMP is used to form dual damascene copper and tungsten interconnect structures.

The CMP process generally involves rubbing a surface of a semiconductor wafer against a polishing pad under controlled pressure, temperature and rotational speed in the presence of a chemical slurry. An abrasive material is introduced between the wafer and the polishing pad, either as particles affixed to the polishing pad itself or in fluid suspension in the chemical slurry. The chemical action serves to oxide the surface material to facilitate its mechanical removal. The abrasive action functions to physically remove a portion of the surface of the wafer in a polishing action. The slurry movement provides temperature control and facilitates the movement of the polishing debris away from the wafer.

Figure 1:
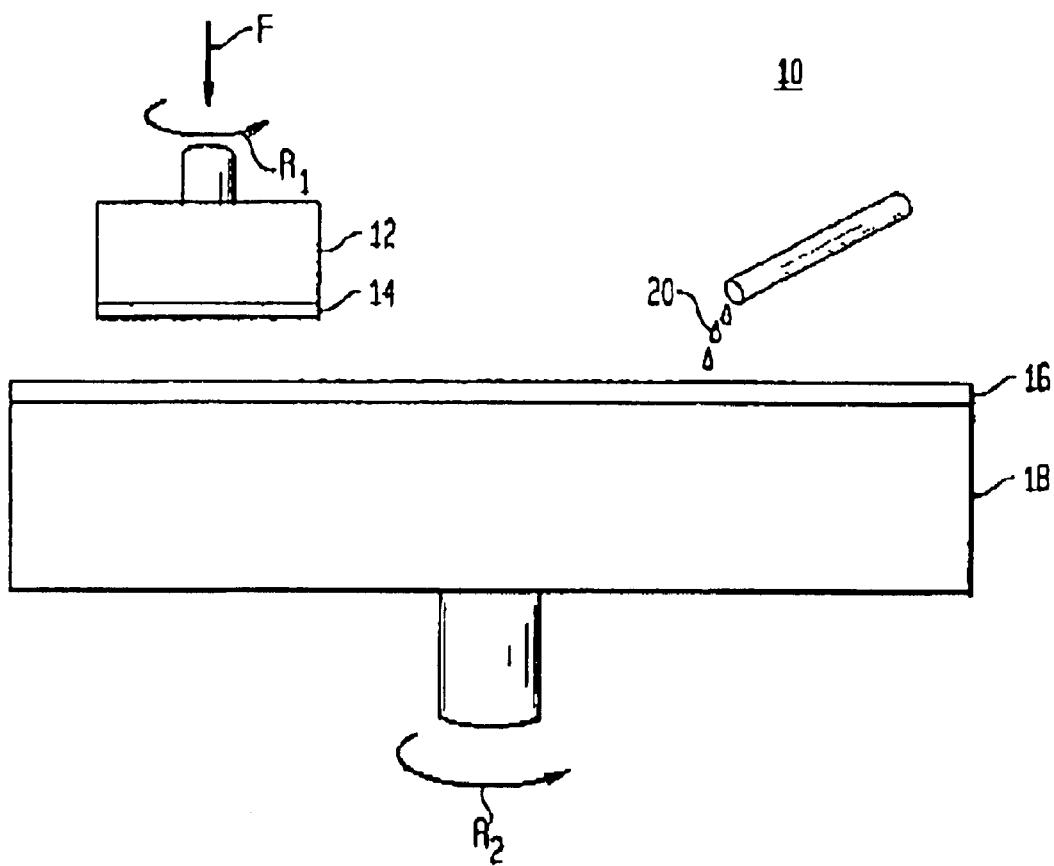
FIG. 1 is a schematic illustration of a chemical mechanical polishing apparatus.

As may be seen in FIG. 1. a chemical mechanical polishing system 10 may include a carrier 12 for holding and moving a semiconductor wafer 14 against a polishing pad 16 supported on a rotatable platen 18. Slurry 20 is used to provide the desired chemical interaction and abrasion when the wafer 14 is pressed and rotated against the polishing pad 16. The rate of material removal from the wafer 14 will depend upon many variables, including the amount of force F exerted between the wafer 14 and the polishing pad 16, the speeds of rotation $R_1$ of the carrier and $R_2$ of the platen, the transverse location of the carrier 12 relative to the axis of rotation of the platen 18, the chemical composition of the slurry 20, the temperature, and the composition and history of use of the polishing pad 16. Numerous configurations of CMP machines are known and are available in the industry. One manufacturer of such CMP machines is Applied Materials, Inc. of Santa Clara, Calif. One manufacturer of polishing pads is Rodel, Inc. of Phoenix, Ariz.

A polycrystalline material, such as a metal layer on a semiconductor wafer 16, may have a plurality of microcrystalline grain orientations. As a polycrystalline material begins to nucleate and grow on a sample surface, the Gibbs surface energy defines the rate at which the crystalline surface grows. This surface energy is different for different orientations, as the orientation of the surface defines the angle of the orbitals available for bonding. Some materials such as aluminum have a tendency to nucleate out in a single orientation, and some materials such as tungsten have a tendency to nucleate out in different orientations. Miller indices are used to define the crystalline phase orientations. Aluminum has a strong fiber textural orientation of (111), and a cross-section of an aluminum film will have a very high percent area fraction of the (111) orientation.

Figure 3:
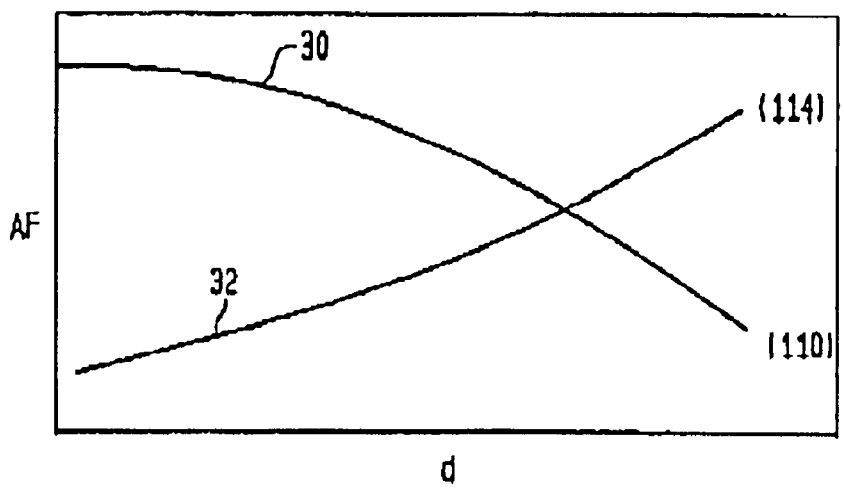
FIG. 3 is an illustration of the relative area fractions of two different microcrystalline orientations of a tungsten film as a function of the depth of the film.
Figure 2:
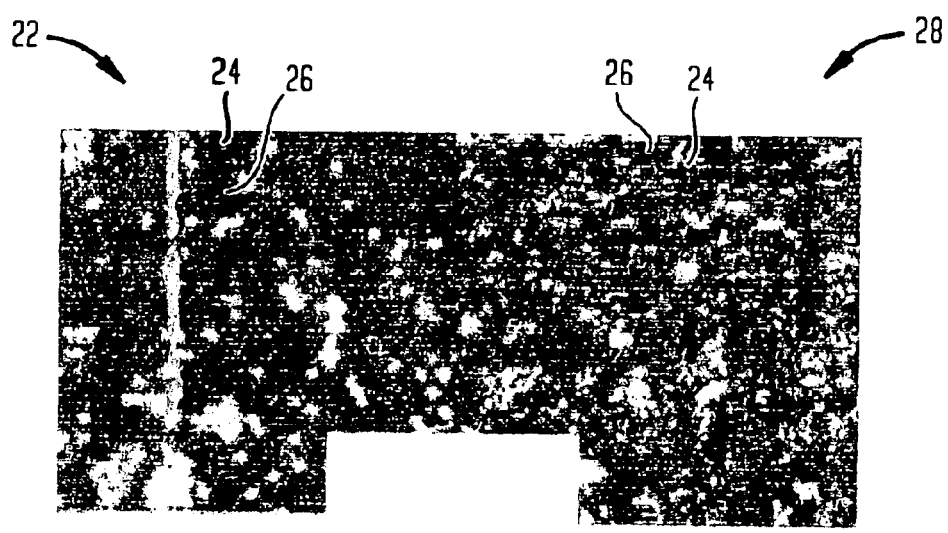
FIG. 2 is a comparison of the SEM orientation maps of the surfaces of two different samples of tungsten films.

When depositing a layer of tungsten metal on a surface of a semiconductor wafer, the area fraction of (110) and (114) grain structure will vary as a function of the depth of the tungsten film. FIG. 2 is a side-by-side comparison of two samples of tungsten films taken at two different partial CMP depths. FIG. 2 shows the orientation maps from a crystal orientation imaging system on a scanning electron microscope taken at two different partial CMP depths of two tungsten film samples. The sample 22 on the left has a high percentage of (110) microcrystalline grain structure 24 and a lower percentage of (114) microcrystalline grain structure 26. The sample 28 on the right has a lower percentage of (110) microcrystalline grain structure 24 and a higher percentage of (114) microcrystalline grain structure 26. FIG. 3 illustrates the relationship between the area fraction (AF) of the respective orientations and the depth (d) of the tungsten film as measured from the substrate surface. Curve 30 shows that the area fraction of (110) material will decrease as the depth of the tungsten film increases, while curve 32 shows that the area fraction of (114) material will increase as the depth of the film increases. The (110) orientation appears to be barrier driven while the (114) orientation is driven by the Gibbs free surface energy, thus the percentage of (110) orientation is greater in the region closest to the substrate (barrier) material. The area fractions of a tungsten film may further vary as a function of deposition temperature, wafer bias and other variables.

The material removal rate during a CMP process may vary between the different plane orientations of a polycrystalline material by greater than a factor of two. Each of the samples illustrated in FIG. 2 had failed endpoint detection; one failed high and one failed low. The reason for these differing results is the different oxidation rates of the (110) and the (114) grain structures when exposed to the oxidizing agent in the slurry used during the CMP process. The sample 22 had a removal rate of approximately 100 angstroms per second while the sample 28 had a removal rate of approximately 40 angstroms per second. Thus, the endpoint detection scheme that assumed a fixed value for the removal rate contained an inaccuracy.

To overcome this problem, the CMP system 10 of FIG. 1 incorporates slurry 20 having a predetermined polarity. The slurry 20 may include a polarity-influencing constituent such as a polarized solute in addition to a primary carrier constituent such as a base solvent, for example water, and an oxidizing constituent. The slurry 20 may also include an abrasive material such as colloidal silica. The polarity-influencing constituent may be one or more material having a quantity and a net polarity sufficient to modify the polarity of the overall slurry solution 20 to measurably influence the material removal rates along the different crystal planes. The selected solute will effectively equilibrate (i.e. more closely match) the oxidation rates of the different orientation phases of the polycrystalline material being polished. By controlling the oxidation rates of the various crystalline planes, the material removal rates of the various crystal orientations of the polycrystalline material may be equilibrated. Because different solutes have affinities for certain bonding sites, a particular solute may differentially affect the oxidation rate of the different crystalline planes. The oxidation of each crystalline plane is a function of the number of available sites and the speed at which the reaction occurs. The introduction of a particular polarity influencing-constituent that has an affinity for a certain type of site will, therefore, increase or decrease the number of sites available for oxidation and will thus affect the oxidation rate. The concentration and the polarity of the selected solute (s) will depend upon the orientation phases that need to be equilibrated with respect to oxidation rate. By using a specially selected solute in slurry 20, it is possible to more closely match the material removal rate of the different orientations, thereby creating a more uniform polishing process and facilitating the more accurate prediction of endpoint. One may appreciate that the polarity of the overall slurry solution is being affected by the selection of a solute in addition to a base solvent. Alternatively, the base solvent may be selected to have a particular polarity, thereby affecting the selection of the solute or even completely eliminating the necessity for a separate solute to achieve a desired polarity. In one embodiment, the primary carrier constituent is selected to be not water, for example it may be alcohol, since water is highly polar and thus causes the differential material removal rate problem described herein.

A solute may be selected for the chemical mechanical polishing of a particular polycrystalline material by using a database derived from empirical data or by using Gibbs free energy calculations of the oxidation rate of each crystalline face in the presence of a particular solvent. In one embodiment, a polycrystalline tungsten layer is polished with a chemically active water-based solution including colloidal silica as the abrasive material, hydrogen peroxide as the oxidizing agent, and a solute having a polarity that is less than that of water and constituting greater than 10% by volume of the slurry 20. In other embodiments is may be desirable to utilize a slurry 20 that has water as its primary carrier constituent and a polarity influencing constituent that has a dipole moment greater than water, such as greater than 1.9. It is believed that the relatively high polarity of prior art slurry having polarity characteristics dominated by the water constituent leads to a high differential material removal rate of the (110) and (114) plane orientations of a tungsten film. A slurry dominated by water constituent refers to a slurry having no constituent substantially influencing net polarity other than water and the oxidizing constituent, e.g. up to 5% by volume hydrogen peroxide. The polarity-influencing constituent of the present invention may be, for example, a material having dipole moment polarity of zero, for example benzene, or a dipole moment of less than 1.8 or less than 1.6 or less than 1.4 or it may be substantially non-polar, i.e. have a dipole moment of less than 1.0. Tables of the polarity of various materials are available in general chemistry texts as well as via the Internet. Typical dipole moment polarity values include: water 1.85; methanol 1.70; ethanol 1.69; 1-propanol 1.68; 1-butanol 1.66; formic acid 1.41; acetic acid 1.74; formamide 3.73; acetone 2.88; methyl ethyl ketone 1.78; acetonitrile 3.92; N,N-dimethylformamide 3.82; diemthyl sulfoxide 3.96; hexane 2.02; benzene 0; diethyl ether 1.15; tetrahydrofuran 1.63; methylene chloride 1.60; and carbon tetrachloride 0. Any of the above materials or others may be used as a solvent or as a solute to provide slurry 20 with a desired polarity value. Proper control of the polarity of the chemically active slurry will minimize the differential removal rate from the various crystal orientations of a polycrystalline material surface, thereby improving the accuracy of any endpoint detection scheme that relies upon an assumed constant material removal rate. The polarity of the slurry 20 may be selected in advance to provide an improved CMP process based upon a prediction of the area fractions of the expected crystalline planes along a cross-section of a metal film, or it may be controlled in response to the actual relative area fractions of the respective crystalline planes along the surface being polished.

While the preferred embodiments of the present invention have been shown and described herein, it will be obvious that such embodiments are provided by way of example only. Accordingly, it is intended that the invention be limited only by the spirit and scope of the appended claims.

We claim as our invention:

1. A slurry for controlling material removal rates from a plurality of different crystalline planes along a surface of a polycrystalline material, the slurry comprising:
   a primary carrier constituent;
   an oxidizing constituent; and
   a polarity-influencing constituent comprising one of benzene and carbon tetrachloride.

2. The slurry of claim 1, wherein the polarity-influencing constituent comprises greater than 10% by volume of the slurry.

3. The slurry of claim 1, wherein the polarity-influencing constituent comprises benzene.

4. The slurry of claim 1, wherein the polarity-influencing constituent comprises benzene in an amount greater than 10% by volume of the slurry.

5. The slurry of claim 1, wherein the primary carrier constituent comprises water and the polarity influencing constituent comprises greater than 10% by volume of the slurry.

6. A slurry for a chemical mechanical polishing process comprising:
   a non-aqueous primary carrier constituent comprising one of the group of methanol, ethanol, 1-propanol, 1-butanol, formic acid, acetic acid, formamide acetone, methyl ethyl ketone, acetonitrile, N,N-dimethylformamide, diemthyl sulfoxide, hexane, benzene, diethyl ether, tetrahydrofuran, methylene chloride and carbon tetrachloride; and
   an oxidizing constituent.

7. The slurry of claim 6, wherein the primary carrier constituent comprises a material having a polarity less than that of water.

8. The slurry of claim 6, wherein the primary carrier constituent comprises a material having a polarity greater than that of water.

9. The slurry of claim 6, further comprising a polarity-influencing constituent having a dipole moment of less than 1.0.

10. The slurry of claim 6, wherein the non-aqueous primary carrier constituent comprises a material having a dipole moment between 0 and 3.96.

11. A slurry for controlling material removal rates from a plurality of different crystalline planes along a surface of a tungsten film, the slurry comprising:
    water as a primary carrier constituent;
    an oxidizing constituent; and
    a polarity-influencing constituent comprising one of benzene and carbon tetrachloride.

12. The slurry of claim 11, wherein the polarity-influencing constituent comprises benzene.

13. The slurry of claim 11, wherein the polarity-influencing constituent comprises greater than 10% by volume of the slurry.

14. A slurry polishing process for controlling material removal rates from a plurality of crystalline planes along a surface of a polycrystalline material, the process comprising selecting a polarity of the slurry to equilibrate material removal rates from the respective crystalline planes.

15. The slurry polishing process of claim 14, further comprising controlling the polarity of the slurry in response to the relative area fractions of the respective crystalline planes along the surface.

16. The slurry polishing process of claim 14, further comprising controlling the polarity of the slurry by adding a polarity-influencing constituent to a primary carrier constituent of the slurry.

17. The slurry polishing process of claim 16, wherein the primary carrier constituent comprises water, and further comprising adding a polarity-influencing constituent having a polarity less than that of water.

18. The slurry polishing process of claim 16, wherein the primary carrier constituent comprises water, and further comprising adding a polarity-influencing constituent having a polar moment less than 1.0.

19. The slurry polishing process of claim 14, further comprising controlling the polarity of the slurry by adding a polarity-influencing constituent having a dipole moment of less than 1.0 to a primary carrier constituent of the slurry.

20. The slurry polishing process of claim 14, further comprising controlling the polarity of the slurry by adding a polarity-influencing constituent comprising greater than 10% by volume of the slurry to a primary carrier constituent of the slurry.

21. The slurry polishing process of claim 14, further comprising selecting the polarity of the slurry in response to a prediction of the area fractions of the crystalline planes expected along the surface.

22. The slurry polishing process of claim 14, further comprising selecting the polarity of the slurry in response to actual area fractions of the crystalline planes along the surface.

23. A polishing process comprising:

providing a polycrystalline material having a plurality of crystalline planes along a surface; and polishing the surface using a chemically-active slurry comprising a primary carrier constituent, an oxidizing constituent, and a polarity-influencing constituent;

further comprising selecting the polarity-influencing constituent to modify a polarity of the chemically-active slurry to effectively equilibrate oxidation rates of the plurality of crystalline planes so that the material removal rates of the plurality of crystalline planes are equilibrated during the step of polishing.

24. The polishing process of claim 23, further comprising selecting the polarity-influencing constituent to comprise greater than 10% by volume of the chemically-active slurry.

25. A slurry for controlling material removal rates from a plurality of different crystalline planes along a surface of a polycrystalline material, the slurry comprising:

a primary carrier constituent;

an oxidizing constituent; and a polarity-influencing constituent having a dipole moment less than 1.0; and wherein the polarity-influencing constituent has a dipole moment of zero.

26. A polishing process comprising:

providing a polycrystalline material having a plurality of crystalline planes along a surface; and polishing the surface using a chemically-active slurry comprising a primary carrier constituent, an oxidizing constituent, and a polarity-influencing constituent having a dipole moment of less than 1.0; and further comprising selecting the polarity-influencing constituent to have a dipole moment of zero.

* * * * *